Aug. 26, 1969     A. B. SWANSON     3,462,765

SURGICALLY IMPLANTABLE PROSTHETIC JOINT

Filed Jan. 6, 1967

INVENTOR.
Alfred B. Swanson
BY
ATTORNEY

United States Patent Office 3,462,765
Patented Aug. 26, 1969

3,462,765
SURGICALLY IMPLANTABLE PROSTHETIC JOINT
Alfred B. Swanson, Grand Rapids, Mich., assignor to Dow Corning Corporation, Midland, Mich., a corporation of Michigan
Filed Jan. 6, 1967, Ser. No. 607,810
Int. Cl. A61f 1/00, 5/04; E05d 7/00
U.S. Cl. 3—1                                         4 Claims

ABSTRACT OF THE DISCLOSURE

One piece surgically implantable prosthetic joint of molded silicone rubber. Prosthesis consists of enlarged center portion with pair of oppositely projecting stem portions. Joint is amputated and stem portions implanted into bone ends. Center portion has width which is large compared to thickness to allow substantially only unidirectional bending. Bending action is obtained solely from inherent flexibility of the material.

Background of the invention

The present invention relates to prosthetics, and more particularly to surgically implantable prosthetic devices for replacing skeletal joints.

The replacement of damaged or diseased joints in the skeleton has been known for some time. If the device used to replace the natural joint structures was to be movable in a manner similar to the natural joint it was heretofore necessary to provide a multiple part structure of rigid clinically inert material. Generally, metals such as stainless steel alloys were used for this purpose. Rigid srtuctures, however, are subject to breakage and are difficult to implant and hold in place once implanted. Tissue growth commonly causes malfunction of the device, necessitating further surgery. Furthermore, while some metals are considered to be clinically inert, some risk of deterioration of the device with time continues to exist.

Rheumatoid arthritis is a fairly common crippling disease leading to deformity and loss of function of joints. These effects are extremely painful and often include complete loss of function of the joints involved. If the hands are involved the afflicted patient may become totally incapable of caring for himself. A relatively simple, substantially certain method of restoring function to such hands has been sorely needed.

Summary

It is an object to the present invention to provide an improved surgically implantable joint prosthesis which is insofar as possible not subject to breakage, or the effects of tissue growth or slight deterioration.

A further object is the provision of a surgically implantable joint prosthesis particularly suited for restoring function to hands crippled by arthritic or destroyed joints.

In accordance with these and other objects there is provided by this invention a one piece body of inherently flexible elastomeric, physiologically inert, material such as, for example, silicone rubber, which may be used to interconnect two bones in the place of the natural joint. The body is formed with an enlarged center portion and a pair of oppositely projecting stem portions of reduced dimensions, the stem portions being adapted for intramedullary implantation in the amputated bone ends adjacent the joint. The inherent flexibility of the material allows the prosthesis to bend and allows function similar to the natural joint.

Other objects and attendant advantages of the invention will become apparent from a consideration of the following detailed description of preferred embodiments, when read in conjunction with the accompanying drawing.

Description of the preferred embodiments

Figure 1:
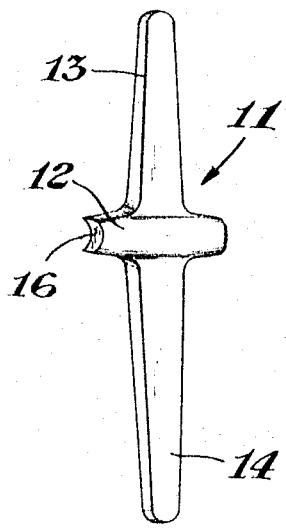
FIG. 1 is a view in perspective of an embodiment of a joint prosthesis in accordance with this invention.
Figure 2:
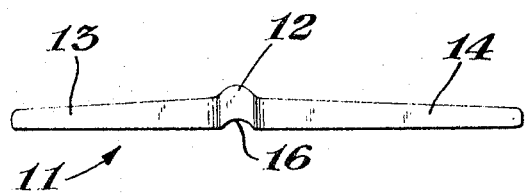
FIG. 2 is a side-elevational view of the prosthesis shown in FIG. 1.

Referring now to the drawings wherein like reference characters designate like or corresponding parts throughout the figures thereof, there is shown in FIGS. 1 and 2, a body (shown generally as 11) of molded inherently flexible elastomeric, physiologically inert, material such as silicone rubber. The body 11 is formed in the shape of an enlarged center portion 12 with a pair of oppositely projecting stem portions 13 and 14 integral therewith.

Figure 3:
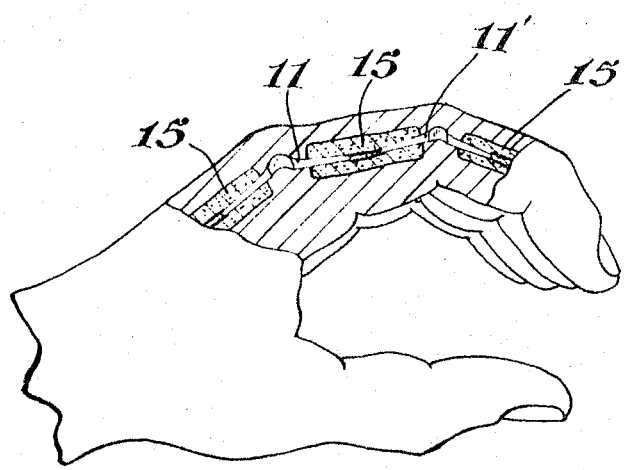
FIG. 3 is a view partly in cross-section of a human hand showing the positions of two prostheses similar to that shown in FIGS. 1 and 2.

FIG. 3 illustrates the placement of the prosthesis for a knuckle 11 and finger joint 11' in a human hand. The joint is in each case partially surgically removed and holes are drilled or reamed in the intramedullary canals of the adjacent bone ends 15. The stem portions of the prosthesis are then embedded in the holes and the connective tissue, fascia and skin are replaced.

It will be realized that although hand joints are shown in the drawing for illustrative purposes, the type of device which constitutes the present invention may be used to replace various other joints as well. Obviously, the size of the device, the precise shape, and angle at which the stem portions project from the center portions may have to be varied to adapt the device to the site at whicht he prosthesis is to be implanted. The use of the term "oppositely projecting" in describing the pair of stem portions therefore should be understood to include not only exactly diametrically opposed projections but stem portions separated by obtuse angles as well.

In order to limit motion of the device and give it strength, the device is preferably shaped to provide maximum bending in the direction which the normal natural joint would normally bend and to substantially eliminate bending in other directions. The prosthesis shown in FIGS. 1–3 is designed for unidirectional bending. This provided by providing the center portion 12 and the adjacent parts of the stem portions 13 and 14 with a width substantially greater than their thickness. Additionally, the provision of a slight concavity 16 (FIG. 2) in the surface of the center portion 12 which is under compression during normal bending provides for easier bending in that direction.

While the prosthetic device was described with reference to the drawings as being made of silicone rubber it will be realized that other inherently flexible, clinically inert materials having sufficient strength may also be used. If desired, reinforcement materials such as fabric, cords, metallic springs, etc. may also be incorporated if desired.

The surface of the device may be provided with irregularities for tissue ingrowth to anchor it more securely in position. If desired, fabric such as Dacron may be applied to the external surface to promote tissue ingrowth.

Various other modifications and variations of the invention will become obvious to those skilled in the art from a consideration of the foregoing.

That which is claimed is:

1. A surgically implantable prosthetic joint for replacing diseased or damaged bone joints comprising:
   a one-piece body of inherently flexible elastomeric, physiologically inert material;
   said body having an enlarged center portion, at least said enlarged center portion of said body having a width substantially greater than its thickness to allow only substantially unidirectional bending; and
   two oppositely projecting stem portions of reduced cross-sectional area, the cross-sectional dimensions of said stem portions corresponding substantially to the dimensions of the intramedullary canals of the bones adjacent said joint for implantation in the amputated ends of said bones, the width of said enlarged center portion extending laterally outwardly on both sides of said stem portions.

2. A prosthetic joint as defined in claim 1 wherein said body is silicone rubber.

3. A prosthetic joint as defined in claim 1 wherein said enlarged center portion has a concavity in the surface which is designed to be in compression during bending to reduce resistance to bending in that direction.

4. A prosthetic joint as defined in claim 3 wherein said body is silicone rubber.

References Cited

UNITED STATES PATENTS

| | | | |
|---|---|---|---|
| 3,182,662 | 5/1965 | Shirodkar | 128—303 |
| 3,349,770 | 10/1967 | Sheehan | 128—303 |

OTHER REFERENCES

"New Concepts in Prosthetic Joints for Use in the Hand" by G. S. Brody et al., The Bulletin of the Dow Corning Center for Aid to Medical Research, vol. 5 No. 3, July 1963, page 10.

Surgical Appliances Catalog by Howmet Corp., Austenal Medical Division, 1964, page 53.

RICHARD A. GAUDET, Primary Examiner

R. L. FRINKS, Assistant Examiner

U.S. Cl. X.R.

16—150; 128—92